US00RE34167E

United States Patent [19]

Mattsson et al.

[11] E Patent Number: Re. 34,167

[45] Reissued Date of Patent: Jan. 26, 1993

[54] DRILL BIT AND ROLLER CUTTER FOR SAID DRILL BIT

[75] Inventors: Michael Mattsson, Sandviken, Sweden; Lars-Erik Tunell, Nelson Bay, Australia

[73] Assignee: Santrade Limited, Lucerne, Switzerland

[21] Appl. No.: 704,810

[22] Filed: May 23, 1991

Related U.S. Patent Documents

Reissue of:

[64] Patent No.: 4,832,136
Issued: May 23, 1989
Appl. No.: 158,097
Filed: Feb. 16, 1988

U.S. Applications:

[63] Continuation of Ser. No. 917,485, Oct. 10, 1986, abandoned.

[30] Foreign Application Priority Data

Oct. 11, 1985 [SE] Sweden ..... 8504711

[51] Int. Cl.[5] ..... E21B 10; E21B 10; E21B 10/16; E21B 10/20

[52] U.S. Cl. ..... 175/57; 175/355; 175/363; 175/364; 175/376; 175/378

[58] Field of Search ..... 175/331, 342, 344, 350, 175/353, 354, 355, 357, 361, 363, 364, 53, 367, 362, 371, 372, 351, 352, 376, 378, 373; 299/80, 86, 31

[56] References Cited

U.S. PATENT DOCUMENTS

| | | | |
|---|---|---|---|
| 1,646,620 | 10/1927 | Loy | 175/364 X |
| 3,797,592 | 3/1974 | Goodfellow | 175/364 X |
| 3,863,994 | 2/1975 | Fink | 175/364 |
| 3,981,370 | 9/1976 | Bingham et al. | 175/361 X |
| 4,399,879 | 8/1983 | Liljekvist et al. | 175/53 |
| 4,454,923 | 6/1984 | Tibussek | 175/363 |

FOREIGN PATENT DOCUMENTS

| | | | |
|---|---|---|---|
| 1805336 | 5/1970 | Fed. Rep. of Germany . | |
| 2742019 | 3/1979 | Fed. Rep. of Germany | 175/361 |
| 2838154 | 3/1980 | Fed. Rep. of Germany | 175/364 |
| 3337931 | 12/1984 | Fed. Rep. of Germany | 175/331 |
| 3521159 | 12/1985 | Fed. Rep. of Germany . | |
| 287856 | 11/1971 | U.S.S.R. | 175/361 |
| 754058 | 8/1980 | U.S.S.R. | 299/86 |

*Primary Examiner*—Hoang C. Dang
*Attorney, Agent, or Firm*—Burns, Doane, Swecker & Mathis

[57] ABSTRACT

A drill bit has a plurality of roller cutters mounted on a front face of the drill bit. The roller cutters are mounted in pairs which are equidistantly spaced from an axis of rotation of the drill bit. Each roller cutter is rotatably mounted in a saddle affixed on the front face. The roller cutters are reversibly mounted in their saddles. Each roller cutter includes a plurality of circumferentially extending cutting structures spaced apart along an axis of rotation of the roller cutter. The cutting structures are arranged non-symmetrically relative to a center plane through the roller cutter so that when a roller cutter is reversed, the location of kerfs cut by the roller cutter change.

7 Claims, 4 Drawing Sheets

DRILL BIT AND ROLLER CUTTER FOR SAID DRILL BIT

Matter enclosed in heavy brackets [ ] appears in the original patent but forms no part of this reissue specification; matter printed in italics indicates the additions made by reissue.

*The present application is a continuation of Ser. No. 06/917,485, filed Oct. 10, 1986, now abandoned.*

BACKGROUND OF THE INVENTION

The present invention relates to a drill bit having saddles for a number of roller cutters, said cutters having rows of cutting means, e.g., hard material inserts, extending along the circumference of the roller cutter, said rows being displaced in the axial direction of the roller cutter. A saddle and the adherent roller cutter are so designed that the roller cutter is reversible mountable in the saddle. The invention also relates to a roller cutter to be used in said drill bit.

When drilling with such a drill bit the hardness of the rock varies between different drill holes. An aim of the present invention is to optimize the drilling in order to achieve the highest possible penetration rate regardless of the hardness of the rock formation. This means that in softer rock formations a bigger distance between the rows should be used than in harder rock formations. At the same time, the invention intends to make it possible to optimize the drilling without having to change the type of roller cutters of the drill bit.

From Swedish Application 7900922-1 a drill bit is previously known. In said drill bit the distance between the rows of the cutting means can be varied by exchange of a roller cutter of a first collection for a roller cutter of a second collection. This known drill bit arrangement however requires two collections of roller cutters while the present invention intends to make it possible to vary the distance between rows by one single type of roller cutter. From German Patent 1805336 a drill bit is previously known, said drill bit makes it possible to vary the distance between rows by removing a supporting arm carrying a number of roller cutters and thus also removing said roller cutters. In this known drill bit the roller cutters are not selectively exchangeable for one another.

THE DRAWINGS

The invention will be described more in detail in the following, reference being made to the accompanying drawings, disclosing an embodiment by way of example. The embodiment is only intended to illustrate the invention that can be varied within the scope of the claims.

In the drawings FIG. 1 shows a top view of a drill bit according to the invention.

FIGS. 5–8 correspond to FIGS. 1–4 with the exception that the distance between the rows is bigger.

Figure 7:
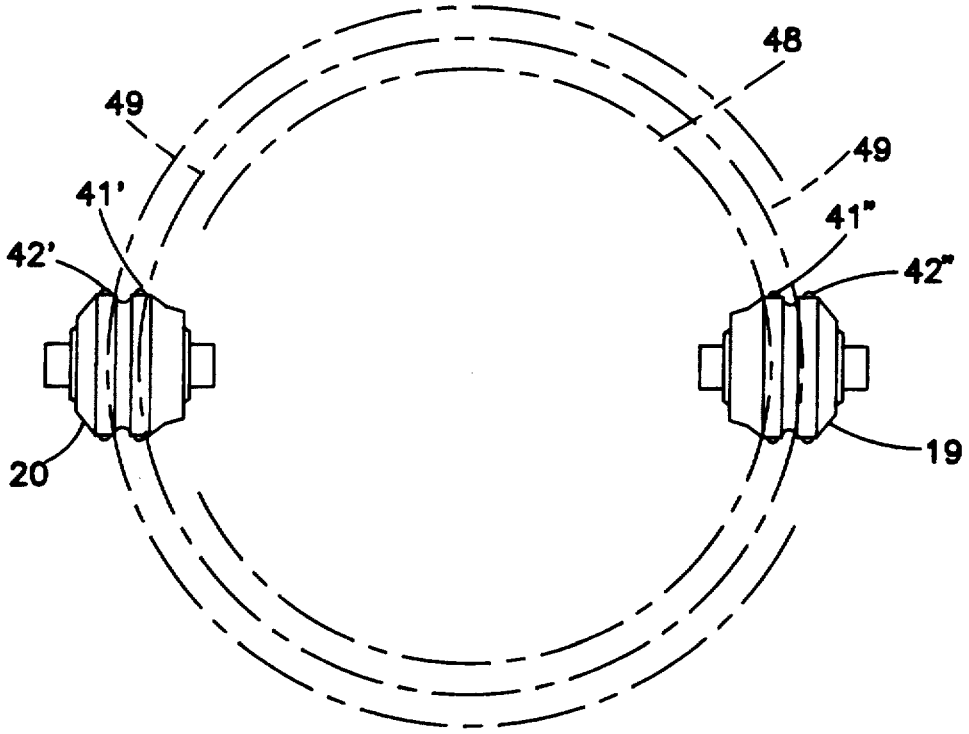
Figure 8:
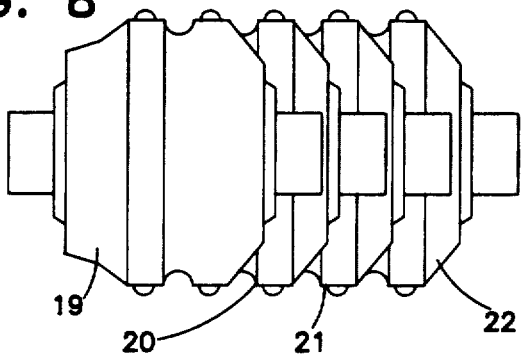
Figure 9:
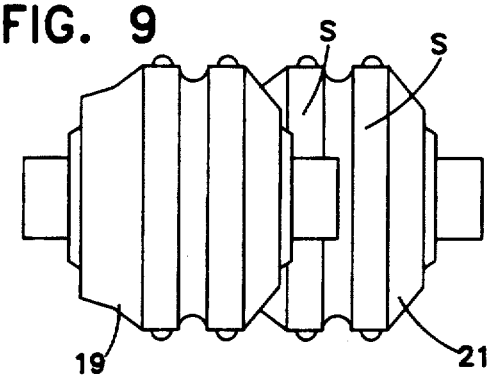

FIG. 9 illustrates the superposition of the roller cutters in a drill bit having the same distance between the rows as the drill bit according to FIGS. 5–8 with the exception that there are a smaller number of roller cutters.

Figure 10:
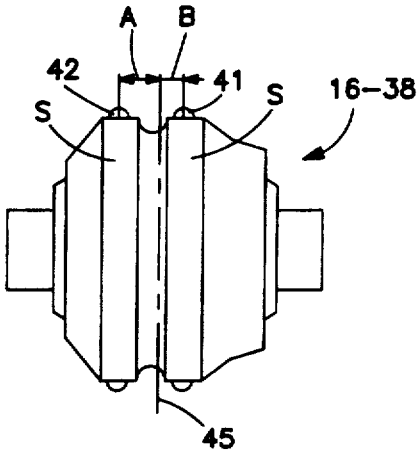

FIG. 10 shows a roller cutter according to the invention.

Figure 11:
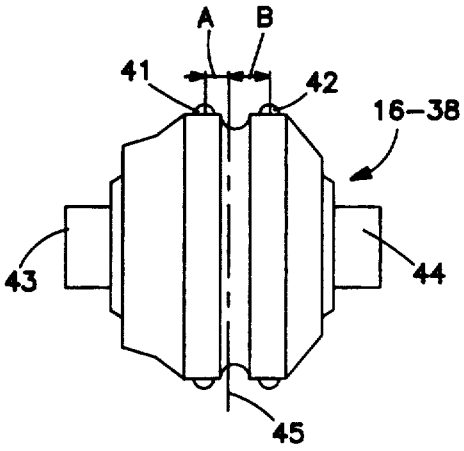

FIG. 11 shows the roller cutter of FIG. 10 in a reversed position.

DETAILED DESCRIPTION OF PREFERRED EMBODIMENTS OF THE INVENTION

The drill bit in the drawings generally designated by the reference number 10 comprises a frame 11 having a front face 11A. A number of roller cutters 13–38, in the disclosed embodiment twenty-six, are mounted in brackets or saddles, the saddles 12 for the roller cutters 16–31 being identical to each other. When drilling, the drill bit 10 is by means of a raise boring or tunnelling machine pressed towards the frontal face 39 of the raise or tunnel. In the disclosed embodiment the roller cutter 13 is of a type disclosed in German Patent 3521159 and the roller cutters 14, 15 have a conventional conical design. The roller cutters 13–15 are intended to machine the portion of the frontal face 39 that is closest to the rotational axis 40 of the drill bit.

The roller cutters 16–38 are designed with two rows 41,42 of cutting means, e.g., hard material inserts, said rows being displaced in the axial direction of the roller cutter. The roller cutters 16–38 are cylindrical and their shaft journals 43, 44 are identical. This means that the roller cutters are reversibly mountable in their saddles 12 and that the cutting means of the roller cutters are engaging the frontal face 39 even if the roller cutters are reversed. By the term cylindrical is meant that the circumferential rows 41, 42 of cutter elements are mounted in cylindrical surface areas S which are spaced equidistantly from the axis defined by the journals 43, 44. The journals 43,44 are mountable in support portions 12A, 12B of the saddles and define an axis of rotation for the roller body.

According to the invention the rows 41, 42 of cutting means are located on each side of the axial center plane 45 of the roller cutter 16–38. The distance B between one row 42 and the plane 45 is longer than the distance A between a second row 41 and the plane 45. In the preferred embodiment the distance B is essentially three times the distance A. This means that the row 41 of cutting means, if the roller cutter 16–38 is reversed, will cut a kerf or groove that is located halfway between the grooves that are cut by the rows 41, 42 of cutting means before the roller cutter 16–38 was reversed, see FIGS. 10 and 11.

The rows of cutting means of the roller cutters 13–38 are arranged to move along concentric circles when the drill bit 10 rotates around the axis 40 of rotation. For the sake of simplicity only two roller cutters 19, 20 are disclosed in FIG. 3. The rows 41', 42' of cutting means of the roller cutter 20 move along a first series of circles 46, 47 and the rows 41'', 42'' of cutting means of the roller cutter 19 move along a second series of circles 48, 49. The saddles 12 of the roller cutters 19, 20 are located at such distance from the axis 40 of rotation that, in the preferred embodiment, the distance B is three times the distance A, the circles 46–49 being located at the same distance from the axis 40 of rotation and in the order 48, 47, 49, 46 from said axis.

Figure 4:
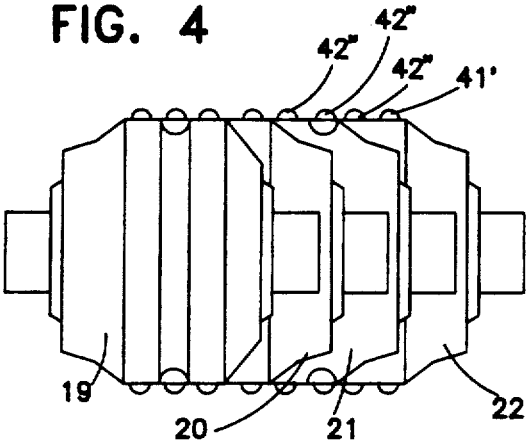
FIG. 4 shows in detail the superposition in FIG. 2 of the roller cutters and thus the distance between the rows that is achieved during drilling.

In FIG. 4 are depicted four roller cutters 19–22 located at radial distances from the centre axis 40. The roller cutters are overlapped radially with respect to the axis 40, with the roller cutters 19 and 21 being mounted in the position of FIG. 11 and the roller cutters 20 and 22 in the position of FIG. 10. As can be seen from FIG. 4 each of the rows 41, 42 of cutting means on the roller cutters 20, 22 moves along its own separate circle in a first series of circles when the drill bit is rotating and that each of the rows 41, 42 of cutting means on the roller cutters 19, 21 moves along its own separate circle in a second series of circles, the distance between two consecutive circles being 2A. In the drill bit of FIG. 1 the saddles for the roller cutters 16–32 are arranged in such a way that the distance between the rows can be varied by these roller cutters whereby, each row of cutting means on all roller cutters 16–32 moves along its own separate circle in the first and the second series of circles.

Figure 1:
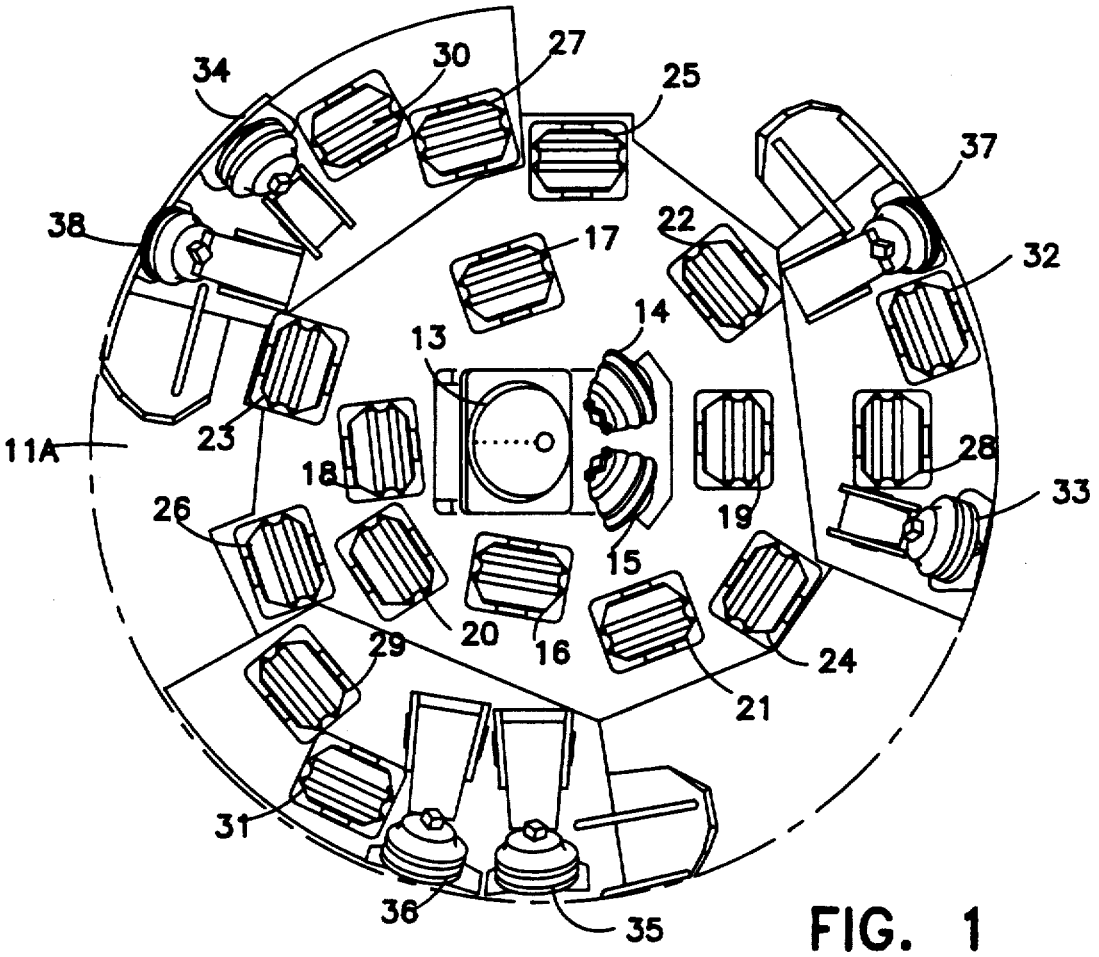
Figure 2:
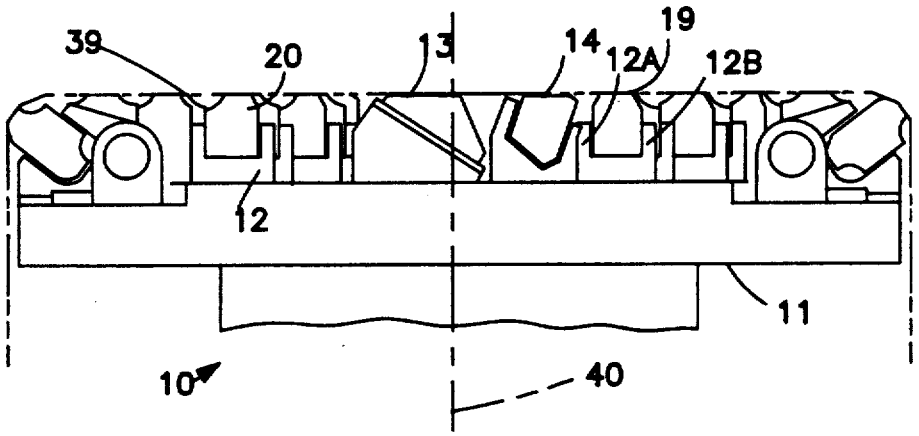
FIG. 2 shows a vertical projection of the drill bit in FIG. 1, the roller cutters have been rotated from their positions in FIG. 1 and superpositioned relative each other in order to illustrate the profile that the drill hole is given.
Figure 3:
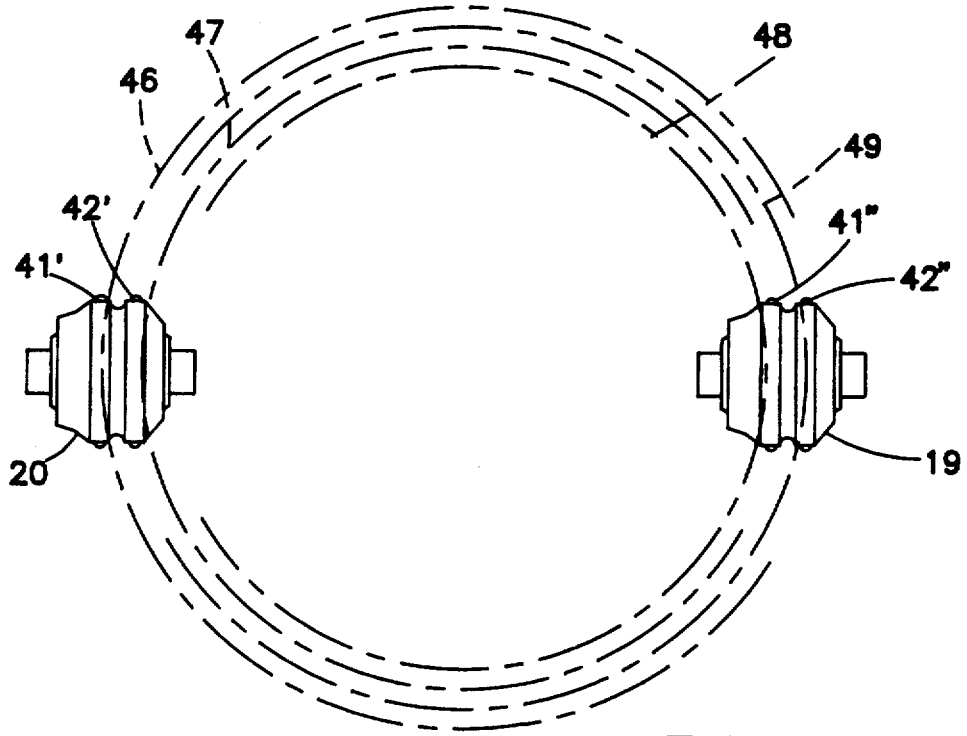
FIG. 3 shows a top view of the drill bit in FIG. 2, however only two roller cutters are disclosed, illustrating the circles along which the cutting means of said roller cutters move when the drill bit is rotating.

The drill bit of FIG. 1 is provided with a first and a second collection internally alike saddles 12, the first collection of saddles carrying the roller cutters, 16, 18, 20, 22, 24, 26, 28, 30 and 32 and the other collection of saddles carrying the roller cutters 17, 19, 21, 23, 25, 27, 29 and 31. These saddles are consequently located at such distance from the axis 40 of rotation that the rows 41, 42 of cutting means on the roller cutters 16, 18, 20, 22, 24, 26, 28, 30 and 32 define the first series of circles when these roller cutters are mounted in the first position, i.e., in the position of FIG. 10, and the rows 41, 42 of cutting means on the roller cutters 17, 19, 21, 23, 25, 27, 29 and 31 define the other series of circles when the last-mentioned roller cutters are mounted in the other position, i.e., the position of FIG. 11.

Figure 5:
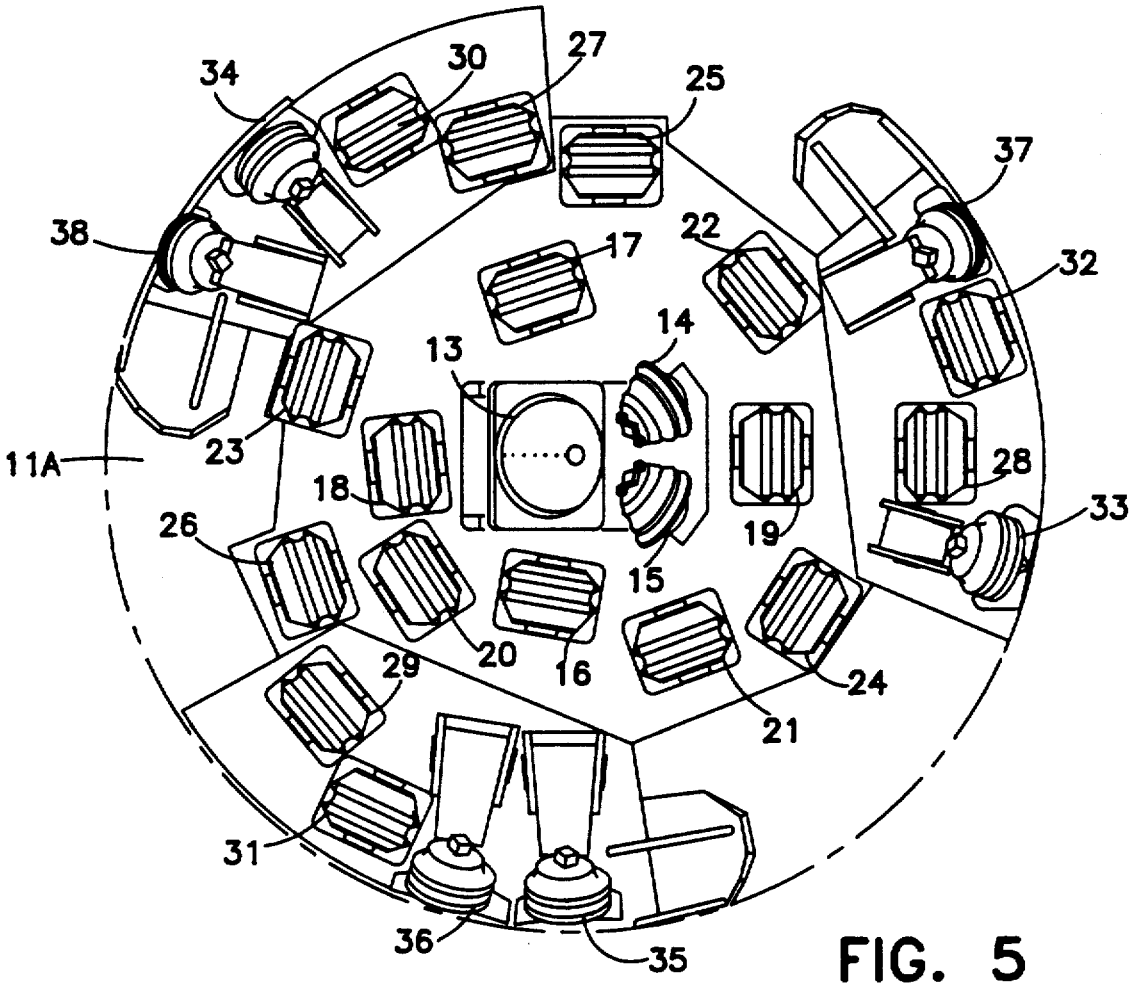
Figure 6:
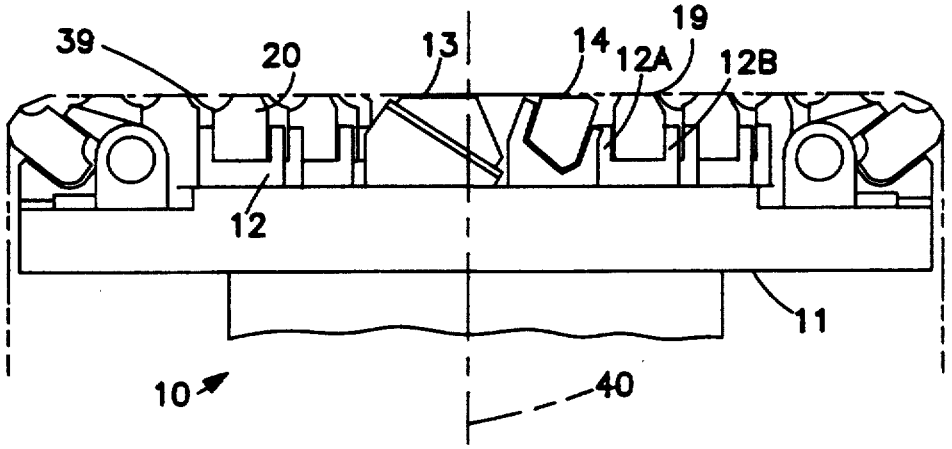

In FIG. 5 it is disclosed how the roller cutters 16, 18, 20, 22, 24, 26, 28, 30 and 32 have been reversed from the first position of FIG. 10 to the second position of FIG. 11. As can be seen from FIG. 8, the four adjacent located roller cutters 19–22 are radially overlapped such that the distance between two consecutive circles is A+B or 4A, the rows 41, 42 of the cutting means moving along said circles. This means that each of the rows 41, 42 of cutting means of the roller cutters 16, 18, 20, 22, 24, 26, 28, 30 and 32 will move along circles that are included in that series of circles along which the cutting means of the roller cutters 17, 19, 21, 23, 25, 27, 29 and 31 are moving. This is illustrated in FIG. 7 disclosing for the sake of clearness only the roller cutters 19, 20. The distance between rows of the drill bit according to FIG. 5 is thus twice as big as the distance between rows of the drill bit according to FIG. 1, and the number of rows of cutting means that are in engagement with the frontal face 39 being unchanged.

Alternatively it is possible to achieve the bigger distance between rows according to FIG. 8 by removing the roller cutters 16, 18, 20, 22, 24, 26, 28, 30 and 32. In order to achieve both as few roller cutters as possible and also to counterbalance the drill bit 10 the roller cutters 15, 34 and 36 are preferably deleted. This means that only one row 41, 42 of cutting means will move along a given circle.

The invention can also have application for other types of roller cutters, e.g., roller cutters having cutting means in the shape of steel discs. Also the invention can be applied in raise boring when a pre-drilled pilot hole is reamed by a drill bit having a large diameter. In such a drill bit center roller cutters 13, 14, 15 are not needed.

We claim:

1. A drill bit for cutting rock, said drill bit comprising:

a frame rotatable about a front-to-rear extending first axis of rotation and including a front face facing forwardly, and a number of cutting assemblies mounted on said front face, a plurality of said cutting assemblies each comprising:

a saddle having a pair of support means, and a roller cutter mounted in said saddle, said roller cutter including a body, a pair of substantially identical journals extending from opposite ends of said body and defining a second axis of rotation for said roller cutter, said second axis of rotation being substantially perpendicular to the direction of rotation of said drill bit, each of said journals being mountable in both of said support means to render said roller cutter reversible between first and second positions, a plurality of circumferentially extending cutting means carried by said body for cutting kerfs in the rock, a first of said cutting means spaced radially from said second axis of rotation by a distance equal to a radial spacing between said second axis of rotation and a second of said cutting means, said first and second cutting means being axially spaced apart with reference to said second axis of rotation, said first cutting means being spaced by a first axial distance from an axial center plane of said roller cutter, and said second cutting means being spaced by a second axial distance from said center plane, said first and second distances being different, said body being devoid of cutting means at a location spaced by said first distance from said center plane in a direction opposite the direction in which said first cutting means is spaced from said center plane, and said body being devoid of cutting means at a location spaced by said second distance from said center plane in a direction opposite the direction in which said second cutting means is spaced from said center plane, so that kerfs cut by said first and second cutting means when said roller cutter is in said first position are disposed at different locations relative to said first axis than kerfs cut by said first and second cutting means when said roller cutter is in said second position, said second axes of rotation of said plurality of cutting assemblies disposed in a common plane oriented perpendicular to said first axis of rotation, such that forwardmost portions of said first and second cutting means of all of said plurality of cutting assemblies are spaced the same distance from said common plane.

2. A drill bit according to claim 1, wherein said first and second cutting means are disposed on opposite axial sides of said center plane, said first distance being three times said second distance.

3. A drill bit according to claim 1, wherein at least a pair of said roller cutters and respective saddles are arranged such that when both roller cutters of said pair are in said first position said first and second cutting means of said one roller cutter are spaced from said first axis of rotation by different distances than said first and second cutting means of the other roller cutter of said pair, and when either roller cutter of said pair is in said first position and the other roller cutter is in said second position at least one of said first and second cutting means of said one roller cutter are spaced from said first axis by the same distances as said first and second cutting means, respectively, of said other roller cutter.

4. A drill bit according to claim 1, wherein each of said first and second cutting means comprises a circumferential row of cutting elements projecting radially with reference to said second axis of rotation.

5. A method of adjusting the cutting pattern of a drill bit which comprises a frame rotatable about a front-to-rear extending first axis of rotation and including a front face facing forwardly, and a number of cutting assemblies mounted on said front face, a plurality of said cutting assemblies each comprising a saddle having a pair of support means, and a roller cutter mounted in said saddle, said roller cutter including a body, a pair of journals extending from opposite ends of said body and defining a second axis of rotation for said roller cutter, each of said journals being mountable in both of said support means to render said roller cutter reversible between first and second positions, and a plurality of circumferentially extending cutting means carried by said body for cutting kerfs in the rock, a first of said cutting means spaced radially from said second axis of rotation by a distance equal to a radial spacing between said second axis of rotation and a second of said cutting means, said first and second cutting means being axially spaced apart with reference to said second axis of rotation, said first cutting means being spaced a first axial distance from an axial center plane of said roller cutter, and said second cutting means being spaced a second axial distance from said center plane, said first and second distances being different such that kerfs cut by said first and second cutting means when said roller cutter is in its first position are non-coincident with the kerfs cut by said first and second cutting means when said roller cutter is in its second position; said second axes of rotation of said plurality of cutting assemblies disposed in a common plane oriented perpendicular to said first axis of rotation, such that forwardmost portions of said first and second cutting means of all of said plurality of cutting assemblies are spaced the same distance from said common plane, said method comprising the step of moving at least one of said roller cutters between its first position in which kerfs cut by said cutting means are coincident with kerfs cut by another of said roller cutters, and its second position in which kerfs cut by said one roller cutter are non-coincident with kerfs cut by said other roller cutter.

*6. A reversible roller cutter comprising:*

*a body,*

*a pair of substantially identical journals extending from opposite ends of said body and defining an axis of rotation for said roller cutter, each of said journals being configured to enable said body to be reversibly mounted in a support means between first and second positions, and*

*first and second circumferentially extending cutting means carried by said body at equal radial distances from said axis of rotation for cutting kerfs in the rock, said first and second cutting means lying in first and second planes, respectively, oriented perpendicularly to said axis of rotation, said first and second planes being disposed parallel to a center plane of said roller cutter, said first and second planes being axially spaced apart from said center plane by first and second axial distances, respectively, said first and second distances being different, said body being devoid of cutting means at a location spaced by said first distance from said center plane in a direction opposite the direction in which said first plane is spaced from said center plane, and said body being devoid of cutting means at a location spaced by said second distance from said center plane in a direction opposite the direction in which said second plane is spaced from said center plane, said first distance being substantially three times said second distance.*

*7. A roller cutter according to claim 6, wherein said first and second cutting means comprises first and second circumferential rows of cutting inserts, respectively.*

* * * * *